United States Patent
Poynter et al.

(10) Patent No.: US 10,525,332 B2
(45) Date of Patent: Jan. 7, 2020

(54) SYSTEM AND METHOD FOR CONDUCTING A DRONE RACE OR GAME

(71) Applicant: OnPoynt Unmanned Systems L.L.C., Richardson, TX (US)

(72) Inventors: Rebecca Noah Poynter, Richardson, TX (US); Ronald J. Poynter, Richardson, TX (US)

(73) Assignee: ONPOYNT UNMANNED SYSTEMS L.L.C., Richardson, TX (US)

( * ) Notice: Subject to any disclaimer, the term of this patent is extended or adjusted under 35 U.S.C. 154(b) by 0 days.

(21) Appl. No.: 15/666,841

(22) Filed: Aug. 2, 2017

(65) Prior Publication Data

US 2018/0036632 A1 Feb. 8, 2018

Related U.S. Application Data

(60) Provisional application No. 62/370,552, filed on Aug. 3, 2016.

(51) Int. Cl.
| | |
|---|---|
| *A63F 9/14* | (2006.01) |
| *H04N 5/247* | (2006.01) |
| *H04N 5/38* | (2006.01) |
| *G06K 7/14* | (2006.01) |
| *B64C 39/02* | (2006.01) |
| *G05D 1/00* | (2006.01) |

(Continued)

(52) U.S. Cl.
CPC ................ *A63F 9/14* (2013.01); *A63F 9/24* (2013.01); *A63H 27/12* (2013.01); *A63H 30/04* (2013.01); *A63K 1/00* (2013.01); *A63K 3/00* (2013.01); *B64C 39/024* (2013.01); *G05D 1/0038* (2013.01); *G06K 7/1417* (2013.01); *G08G 5/0026* (2013.01); *G08G 5/0069* (2013.01); *H04N 5/247* (2013.01); *H04N 5/38* (2013.01); *A63F 2009/2435* (2013.01); *A63F 2009/2439* (2013.01); *B64C 2201/12* (2013.01); *B64C 2201/146* (2013.01)

(58) Field of Classification Search
CPC ....... A63F 9/14; B64C 39/024; G05D 1/0038; G06K 7/1417; H04N 5/247; H04N 5/38; A63K 1/00; A63K 3/00; G08G 5/00; A63H 27/00; A63H 30/04
See application file for complete search history.

(56) References Cited

U.S. PATENT DOCUMENTS

| 8,818,083 B2 | 8/2014 | Jonchery et al. |
| 9,011,250 B2 | 4/2015 | Condon et al. |

(Continued)

FOREIGN PATENT DOCUMENTS

| KR | 1020160131598 A | 11/2016 |
| WO | WO-2017088298 A1 | 6/2017 |
| WO | WO-2017106155 A2 | 6/2017 |

*Primary Examiner* — William H McCulloch, Jr.
*Assistant Examiner* — Yingchuan Zhang
(74) *Attorney, Agent, or Firm* — Foley & Lardner LLP

(57) ABSTRACT

A system and method of conducting a drone race or game in a contained area is disclosed herein. The system may also include cameras attached to the drones and the video feed from the camera is transmitted to a computing device used to control the drone and to display the video feed. The system may also use computing devices and monitors to display the video feeds from the cameras attached to the drones. The system may also be configured as a game with information points.

16 Claims, 14 Drawing Sheets

(51) Int. Cl.
*A63K 1/00* (2006.01)
*G08G 5/00* (2006.01)
*A63H 27/00* (2006.01)
*A63H 30/04* (2006.01)
*A63K 3/00* (2006.01)
*A63F 9/24* (2006.01)

(56) References Cited

U.S. PATENT DOCUMENTS

| | | |
|---|---|---|
| 2009/0284553 A1 | 11/2009 | Seydoux |
| 2015/0346722 A1* | 12/2015 | Herz .................... G05D 1/0038 701/2 |
| 2016/0158638 A1 | 6/2016 | Olsen |
| 2016/0250535 A1 | 9/2016 | Yatsko |
| 2016/0295246 A1* | 10/2016 | Laksono .......... H04N 21/21805 |
| 2017/0039413 A1* | 2/2017 | Nadler ................ G06K 9/6201 |
| 2017/0127245 A1* | 5/2017 | Adkins ................ H04W 4/046 |
| 2017/0174343 A1* | 6/2017 | Erickson ............... B64C 39/024 |
| 2017/0285633 A1* | 10/2017 | Poornachandran .. G05D 1/0022 |
| 2018/0033312 A1* | 2/2018 | DeLuca ............... G08G 5/0008 |
| 2018/0203465 A1* | 7/2018 | Suzuki .................. A47G 29/14 |

* cited by examiner

SYSTEM AND METHOD FOR CONDUCTING A DRONE RACE OR GAME

CROSS-REFERENCE TO RELATED APPLICATION

This patent application claims priority to U.S. Provisional Patent Application No. 62/370,552, filed Aug. 3, 2016, naming inventors Rebecca Noah Poynter and Ronald J. Poynter, and entitled "A SYSTEM AND METHOD FOR CONDUCTING A DRONE RACE OR GAME," which is incorporated by reference in its entirety for all purposes.

FIELD

The present invention relates to the operation of a drone race, and, more specifically, to a system and method for conducting a drone race or game in a contained or designated area(s), indoor or outdoor.

BACKGROUND

An unmanned aerial vehicle (hereinafter "UAV" or "drone") is an aircraft designed for flying without a human pilot on board. UAVs are used in various industries and capacities. For example, UAVs are currently being used for reconnaissance, particularly in military operations, and some private companies are experimenting with UAV technology to deliver packages. Further, decreasing costs of UAVs and related equipment has resulted in the growth of UAV hobbyists. Currently, UAVs may be remotely piloted by human pilots who may be located in the general vicinity of the aerial vehicle, or halfway around the world.

Because drones are available to the public and are increasingly popular with hobbyists, there becomes an increasing need for areas dedicated to drones, specifically for drone races. The Federal Aviation Administration (FAA) has a list of requirements for drones flown for recreation:

- If the drone is flown outdoors, the drone must be registered if over 0.55 pounds,
- the drone must be flown 5 miles from airports without prior notification to airport and air traffic control, and if the drone is flying within 5 miles of an airport, the operator must notify the airport and the air traffic control tower,
- The drone must yield right of way to manned aircraft,
- The drone must kept in sight (visual line of sight),
- The drone must be less than 55 pounds, and
- The operator must follow community-based safety guidelines.

The FAA website also provides a list of airspace restricted areas, such as stadiums, areas in or around a wildfire firefighting operation, and within the greater Washington, D.C. area. Therefore, there is a need to create an area capable of conducting a drone race or game while keeping in mind restrictions set down by the FAA.

Another concern for current drone racing systems is the matter of how spectators will view the race. There is a need to create a system for conducting a drone race or game that allows spectators to view the drone race.

SUMMARY

Disclosed herein is a system and related method, which may interface and may be implemented with an aerial vehicle, for the purpose of conducting a drone race or game in a contained or designated area(s).

In accordance with embodiment of the present invention, a system and method for conducting a drone race or game in a contained or designed area(s) are provided which substantially eliminates or reduces disadvantages associated with previous systems.

In accordance with another embodiment, a system for conducting a drone race or game in a contained or designed area(s) is provided. The system comprises a plurality of sensor readers attached to a plurality of obstacle structures. The system further comprises a plurality of drones, a plurality of computing devices, and a race server for communication between the sensor readers, the drones, and the computing devices. The plurality of sensor readers sends customized timestamps to the race server when the sensor readers detect the drones. In another embodiment, each of the drones comprises a camera and transmits the video feed from the camera to the computing devices. In addition, data tags may provide instructions to fly between designated locations or structures.

In accordance with another embodiment, a method for conducting a drone race or game in a contained or designed area(s) is provided. The method comprises temporarily attaching a sensor to each of a plurality of drones; calibrating a plurality of sensor readers to detect the sensor temporarily attached; calibrating each of the plurality of drones to correspond to a computing device; transmitting a customized timestamp from the plurality of sensor readers to a race server; and determining a position of each of the plurality of drones. The method may also comprising routing a received transmission from a camera attached to the drones to the corresponding computing device. In various instances a system may use a device to capture timing data such as by monitoring a radio transmission from a drone such as a video transmitter.

A system for conducting a drone race or game in a contained area is provided. The system may include a plurality of sensor readers attached to a plurality of obstacle structures. The system may also include a plurality of drones, wherein each drone comprises a camera and at least one of a temporarily attached sensor and a radio transmitter connected to the camera. Moreover, in various embodiments, a system includes a plurality of computing devices, wherein each computing device has a graphical user interface and corresponds to one of the plurality of drones to control the drone. Yet furthermore, in various embodiments there is provided a web server connected to a communication network, and to the plurality of computing devices via the communication network. Additionally, in various embodiments each of the plurality of sensor readers sends a customized timestamp to the web server in response to an indication by at least one sensor reader of the plurality of sensor readers that at least one of the plurality of drones is detected by at least one sensor reader of the plurality of sensor readers in response to at least one of detecting by the at least one sensor reader a change in an amplitude of a transmitted signal of the radio transmitter and detecting by the at least one sensor reader a temporarily attached sensor attached to the at least one drone of the plurality of drones.

A leader board coprocessor of a race server of a drone race system is depicted. The leader board coprocessor may include a drone classification engine configured to receive a self-reported classification data from a first drone via a first sensor transmitting the self-reported classification data to a sensor reader of the drone race system. In various instances, the drone classification engine directs a leader board generator to display the first drone within a first drone class. The leader board coprocessor may include a race channel controller configured to transmit a leader board object to a network for distribution to at least one of a race site computing device and a remote computing device (or mobile device). The leader board coprocessor may also include a drone instantiator configured to instantiate a second drone for insertion into the leader board object in response to detecting by the sensor reader a second drone. Finally, the leader board coprocessor may include a timing engine configured to time a race of the first drone and the second drone, in response to ascertaining at least one amplitude peak of a first transmitted signal of the first drone by the sensor reader and at least one amplitude peak of a second transmitted signal of the second drone by the sensor reader.

BRIEF DESCRIPTION OF THE DRAWINGS

The present invention will be more fully understood by reference to the following detailed description of the preferred embodiments of the present invention when read in conjunction with the accompanying drawings, wherein.

Figure 1:
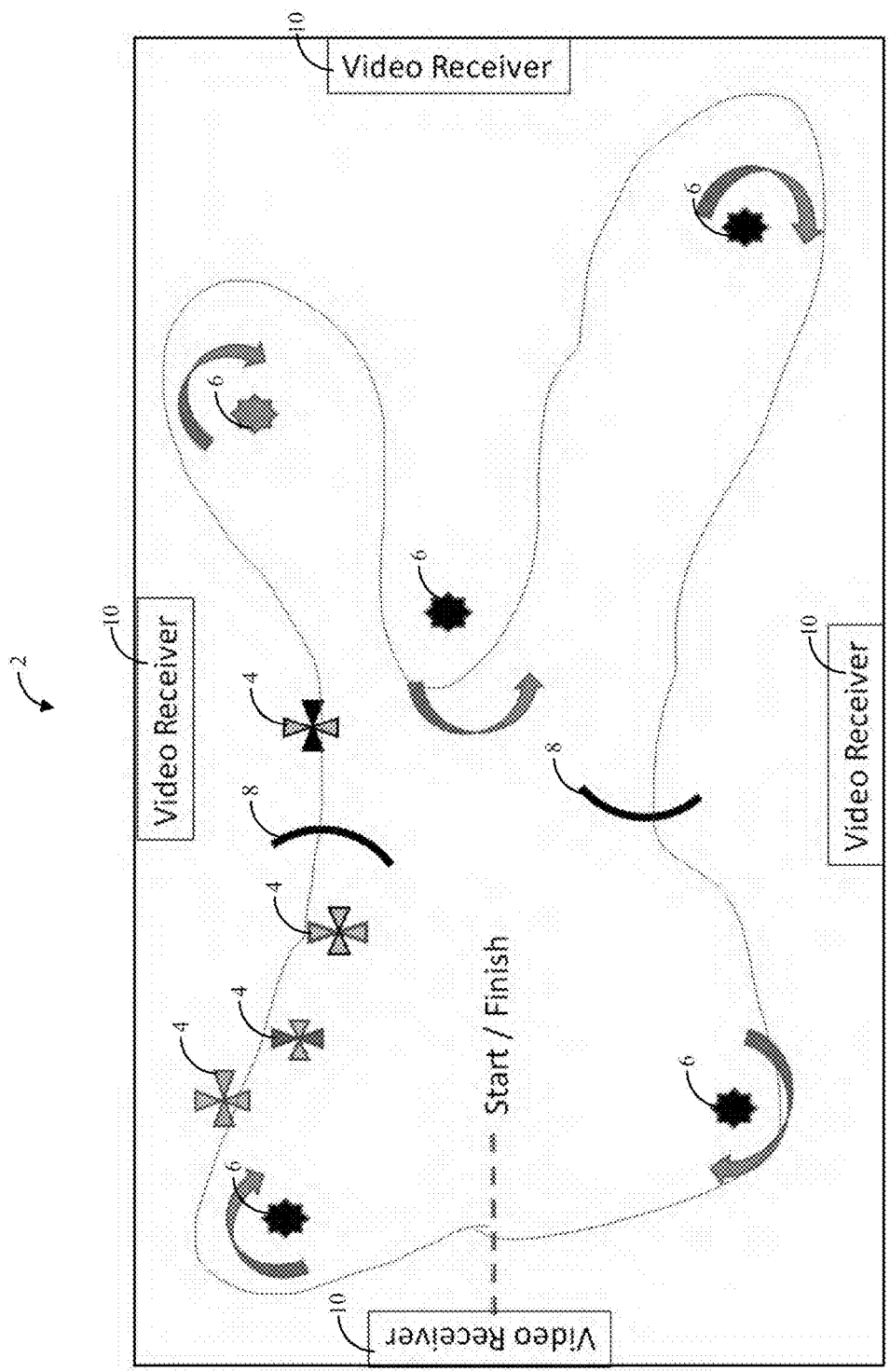
FIG. 1 depicts an exemplary embodiment of a system for a drone race in a contained area.

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms may be used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, or otherwise reserves all copyright rights whatsoever.

The term "computer processing device" or computing device means any electrical device capable of accepting stored program instructions from a computer readable medium and processing those program instructions to perform a defined task. Such devices include, but are not limited to, a mainframe, workstation, desktop, laptop, notebook, or tablet computer, a database server, web server, mobile device or the like. One of ordinary skill in the art will appreciate that the construction, choice of programming language, programming, operation, and functionality of such computer processing devices is well known, rendering further description of such devices unnecessary in this regard.

The system of the present invention can be implemented on a computing device platform that is capable of local or remote access by a user. For example, the computing devices can be a stored program computer such as a desktop, laptop, server, mainframe, or the like, including but not limited to a RISC or CISC processor, a DSP, a programmable logic device or the like capable of executing program instructions. Further it is possible that the system may utilize any one or some combination of the aforementioned devices. Choice of hardware and implementation is considered within the skill of one of ordinary skill in the art for which the invention applies.

Figure 2:
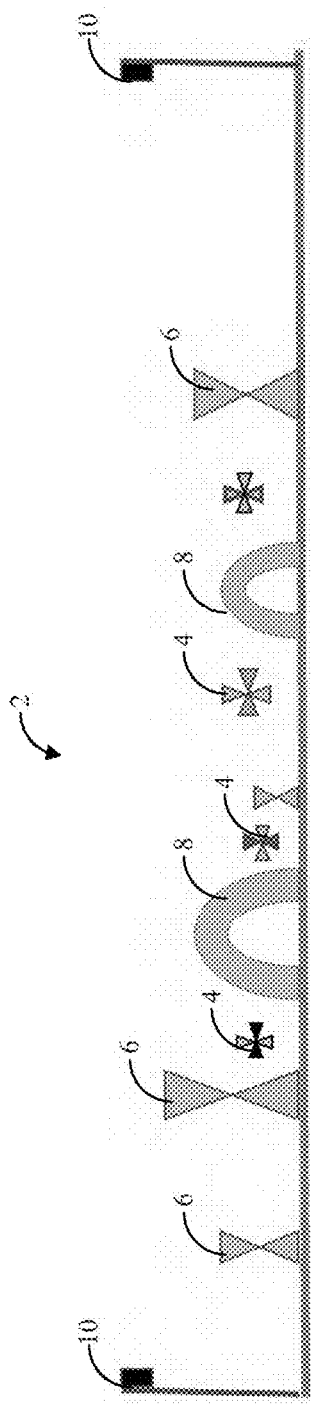
FIG. 2 depicts a side view of the exemplary embodiment of a system for a drone race in a contained area.

With reference to FIGS. 1-14, but particular emphasis on FIG. 1, a top view is shown of an exemplary embodiment of a drone racing system 2, such as a system for a drone race in a contained area, and with particular emphasis on FIG. 2. a side view is shown of the exemplary embodiment of the drone racing system 2. The drone racing system 2 for conducting a drone race has multiple drones 4 following a race track, and the race track has multiple obstacles, flags, and/or information points to increase the difficulty of the race, such as pylons 6 and hoops 8 and gates. In various embodiments, the drones 4 are tagged with temporarily attached RFID tags, or other types of temporary sensors such as an RF transmitter 31, such as a video transmitter 31 emitting radio frequency energy. The obstacles, in turn, are attached to RFID tag readers, or other types of sensor readers such as a receiver 32 to detect the intensity, the change of intensity, and/or the content of the radio frequency energy emitted by the RF transmitter(s) 31. When a drone 4 with a temporarily attached RFID tag and/or RF transmitter 31 passes through or near one of the obstacles placed along the race track, the tag reader and/or RF receiver 32 will detect the RFID tag and/or radio frequency energy as the drone 4 passes by and transmit this information to a race server 1206 that monitors the drone race. The race server 1206 uses the information from the tag readers and/or RF energy to determine the race position of each drone 4 in the drone race. For example, a detected radio frequency energy may increase in amplitude as a drone 4 approaches a receiver 32 and decrease in amplitude as the drone 4 travels away from a receiver 32 so that the point of inflection (e.g., the peak amplitude) coincides in time with a closest approach of the drone 4 to the receiver 32. Video receivers 10 or video cameras may be set up around the contained area of the drone race to capture video of the drone race. An overhead camera 11 may be set up above the race course and looking downward to allow determination of relative positions and/or progress through the course of drones 4 and/or to view the entire race course.

Obstacles of the drone race system may be pylons 6, flags, hoops 8, or any designated structure or information points and have attached sensor readers and/or radio frequency receivers 32 for tracking the drones 4 of the drone racing system 2. The obstacles may comprise other shapes and sizes and placed at various positions on the race track to increase or decrease the difficulty of the drone race. The obstacles may be constructed to improve portability so that the obstacles may be transported from one contained area to another contained area, or moved within the contained or designated area. The sensor readers and/or radio frequency receivers 32 attached to the obstacles may be attached anywhere on the obstacles to effectively detect the sensor temporarily attached to the drones 4 and/or detect changes in the characteristics (e.g., content and/or amplitude) of the radio frequency energy transmitted by the drones 4 as they pass by or pass through the obstacles on the race track of the drone racing system 2. The sensor readers may use any type of communication channel to communicate with the race server 1206, such as, as mentioned, detecting changes in the characteristics (e.g., content and/or amplitude) of the radio frequency energy transmitted by the drones 4.

In one embodiment of the drone racing system 2, the temporary sensor may be RFID tags and the sensor readers can detect RFID tags. Other types of sensors and sensor readers that may be implemented with the drone race system are QR tags and QR readers, magnetic stripes, Bluetooth transmitters and receivers, or wireless tracking systems, for instance, a radio frequency transmitter 31, such as a video transmitter 31 serving as the so-called sensor and a radio frequency receiver 32 capable of detecting an amplitude of a signal transmitted by the radio frequency transmitter 31 serving as the so-called sensor reader.

According to another embodiment of the drone race system, virtual information points may be positioned at various locations along the race track and/or within the contained or designated area. These virtual information points may be customized, and information points may be individual and specific to an individual drone race or game. Once a drone 4 enters a prescribed radius of the information point, the drone racing system 2 triggers an alert and may prompt the pilot of the drone 4 for action. The prompt to the pilot may comprise a question presented to the pilot via a computing device synchronized to the drone 4. Alternatively, the prompt may comprise a GPS location for a new location in the contained or designated area, so as to lead the pilots on a scavenger hunt. The trigger and prompt process for the virtual information points may be customized to suit the requirements or specifications of each drone race or game.

Cameras may be attached to the drones 4 participating in the drone race. The cameras may capture live streaming footage of the drones' surroundings, or alternative, may capture live streaming footage of the environment in front of the drone 4. The cameras attached to the drones 4 may be any type of camera suitable for drone 4 racing or for transmitting live streaming footage with accurate and clear reception. Video receivers (such as antennas) 10 may be positioned on the edges of the contained area to receive transmissions from the drones 4 of the drone race, including the camera video transmissions. As mentioned video receivers (such as antennas) may be positioned along the race course, such as on pylons 6 or hoops 8.

In an alternative embodiment, transceivers may be positioned on the edges of the contained area to transmit instructions from the pilots of the respective drones 4 through the computing device corresponding to each drone 4. The transceivers may be any electrical device capable of receiving and transmitting information and/or data from the sensor readers, the drones 4, the pilots' computing devices, and/or the race server 1206.

The computing devices of the drone racing system 2 may include smartphones, tablets, laptops, desktops, or any other type of electrical device capable of processing program instructions for performing a certain task. In one embodiment, the computing devices may comprise an application designed to communicate with a drone 4. Each computing device corresponds to one drone 4, and the pilot uses the application of the computing device to monitor the movements of the drone 4. The application of the computing device may receive the video transmissions from the camera of the corresponding drone 4 and display the video transmissions from the drone camera with a drone pilot controls overlay.

The video transmissions from the drone cameras may be transmitted to FPV (first person view or first person video) goggles. The drone 4 may be set up to facilitate the use of FPV goggles. The use of FPV goggles simulates an immersive first-person experience, as if the pilot was actually sitting in the cockpit of the drone 4. FPV goggles may also be available to spectators to view different perspectives of the drone race. Alternatively, the video transmissions from the drone cameras may be available to view via a web/internet-based application for spectators and/or may be viewed on a tablet or other mobile devices as desired.

Participants of the drone race system may register online with the race server 1206. Online registration may include calibrating the participants' computing device to monitor and/or a drone 4 of the drone racing system 2. The online registration process may take in the participants' names, personal information, drone information, and social media information, and may synchronize with an account on the race server 1206 or on an application.

Figure 3:
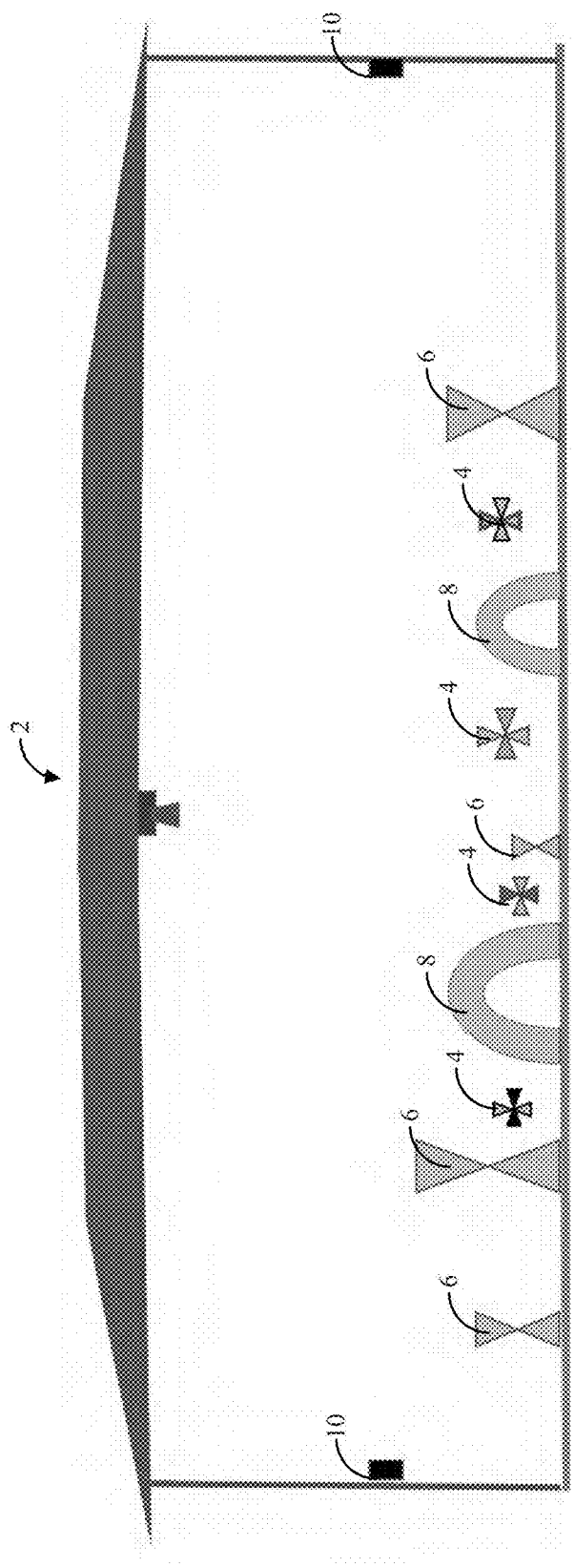
FIG. 3 depicts a side view of an exemplary embodiment of a system for a drone race in an indoor contained area.

With reference to FIGS. 1-14, but particular emphasis on FIG. 3, a side view is provided of an exemplary embodiment of a drone racing system 2 for a drone race in an indoor contained area. When installed in an indoor contained area, the system may include an overhead camera 11 for an overhead view of the drone race, and further supplements the video displays for spectators and for the pilot participants of the drone race.

Figure 4:
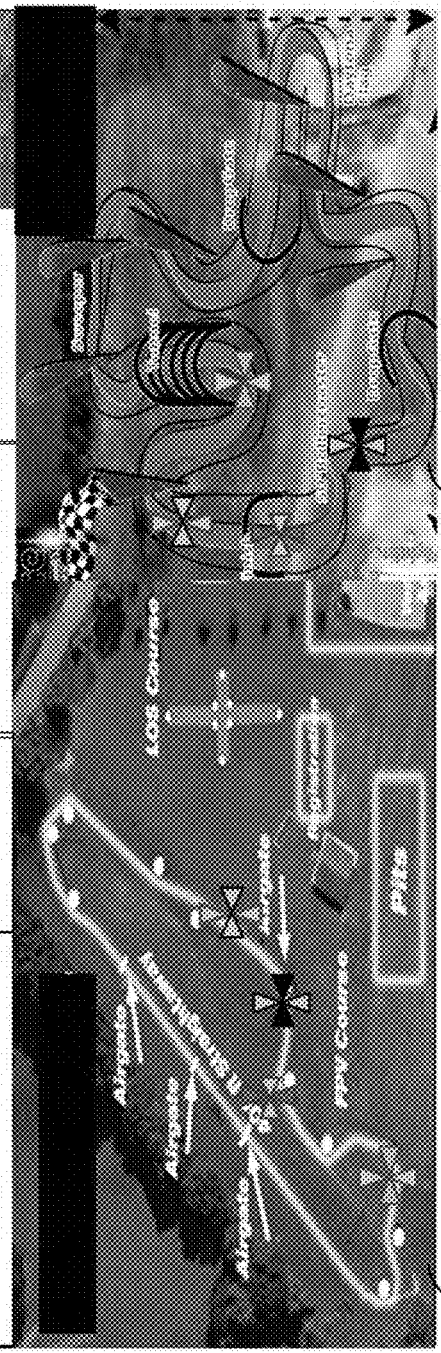
FIG. 4 and FIG. 5 depicts exemplary embodiments of a leader board of the drone race system.
Figure 5:
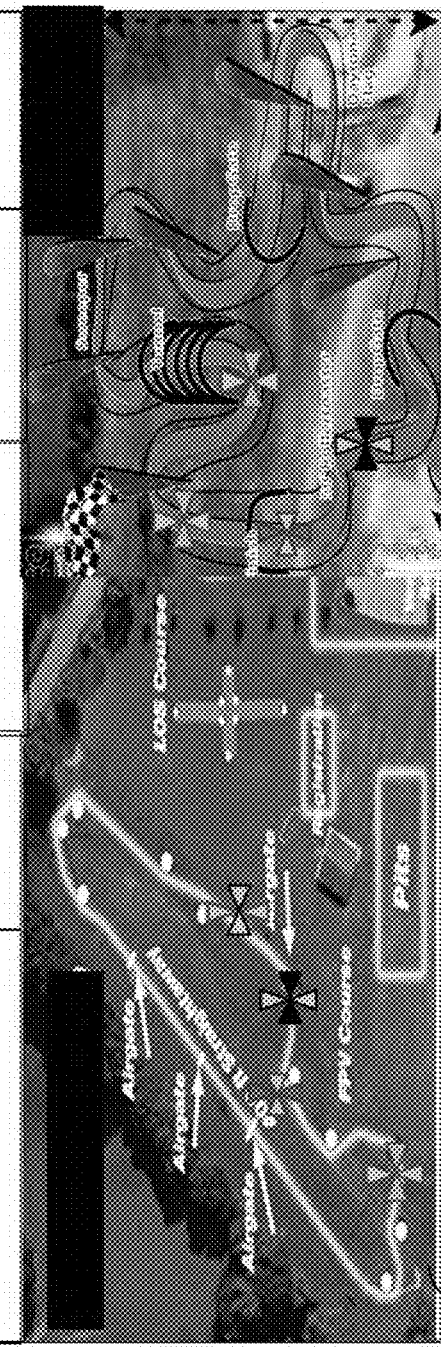

With reference to FIGS. 1-14, but particular emphasis on FIG. 4 and FIG. 5 exemplary embodiments are shown of a leader board of the drone race or game system. The leader board is a scoreboard showing the names and current information about the competitors. FIG. 4 illustrates a leader board 13 with four competitors 14-1, 14-2, 14-3, and 14-4, and shows information such as the name 15 of the drone 4, the time 16 elapsed between the drone 4 passing from the second to latest gate to the latest passed gate, pylon or hoop, the average time 17 the drone 4 takes to make a single lap, and the total time 18 from the start of the race to the present time. The information may include aspects such as maximum speed, fastest lap, average speed, etc. The information of the leader board 13 is updated, for instance, on demand, periodically, or continuously, to show current information, and the information of the leader board 13 may be shifted up or down to reflect a drone's current place in the drone race or game. The leader board 13 may optionally show the live feed 19 from the drone camera, or the video transmission that a FPV goggle would receive. The leader board of FIG. 4 shows also the a graphical and dynamic view of the race track 20 (e.g., "Dynamic Graphical Map") generated by the drone race or game system to take into account drone speed, time at each gate, and other data to calculate the position of the drone 4 in the race. This graphical dynamic view of the race track, like the rest of the leader board, updates, for instance, on demand, periodically, or continuously, to show current status of the drones 4. In various instances, the Dynamic Graphical Map may comprise a three-dimensional representation of a race course that may be viewed by drone operators, spectators, and/or third parties, such as via an electronic device running an application. Additionally, the leader board may comprise an overhead view 21 of the race track from an overhead camera. The leader board scores may be used in a community ranking for race or game participants available on a web or internet based application.

Figure 6:
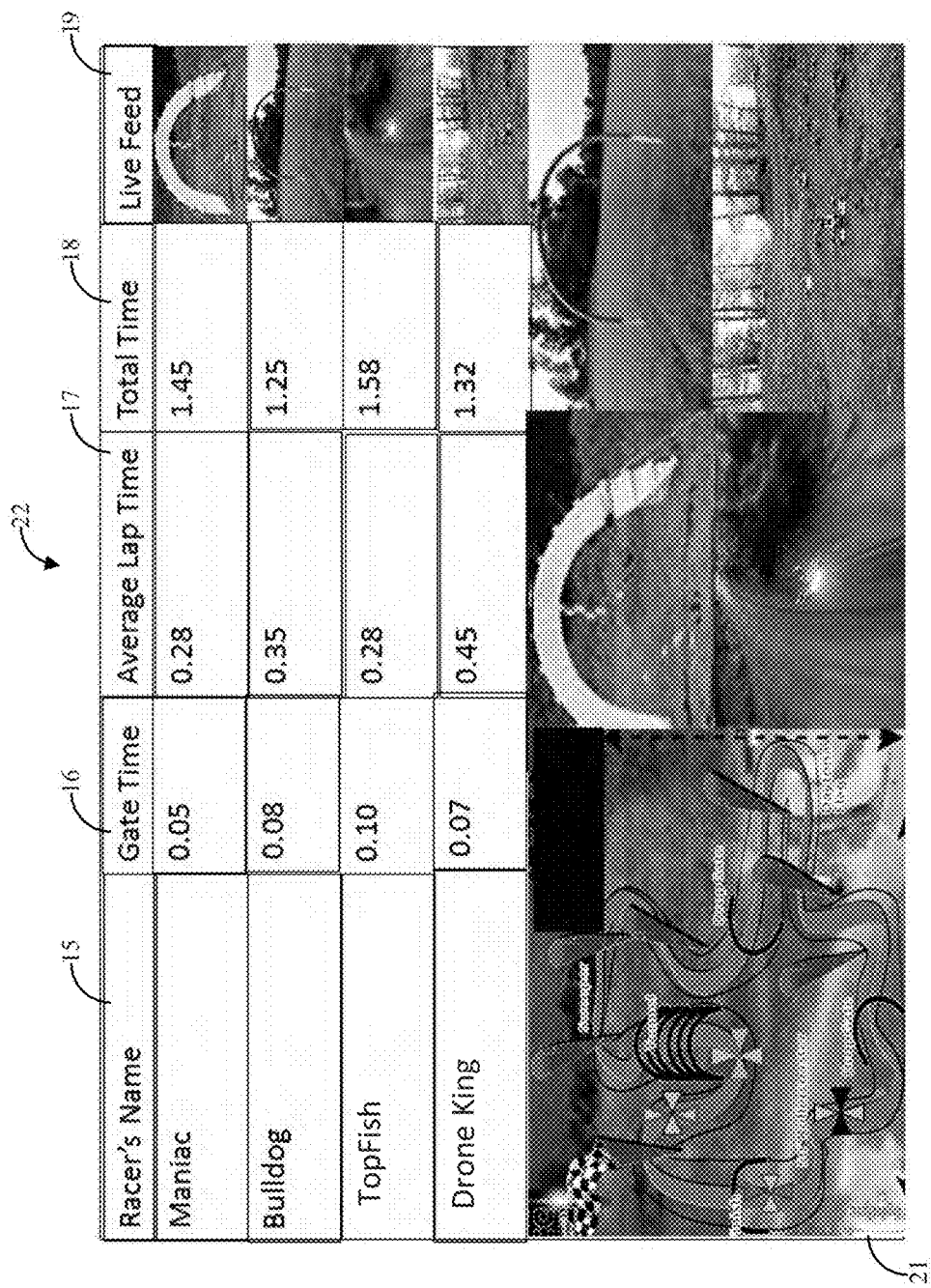
FIG. 6 illustrates another exemplary embodiment of a leader board with enlarged views of video feeds from the drone cameras.
Figure 7:
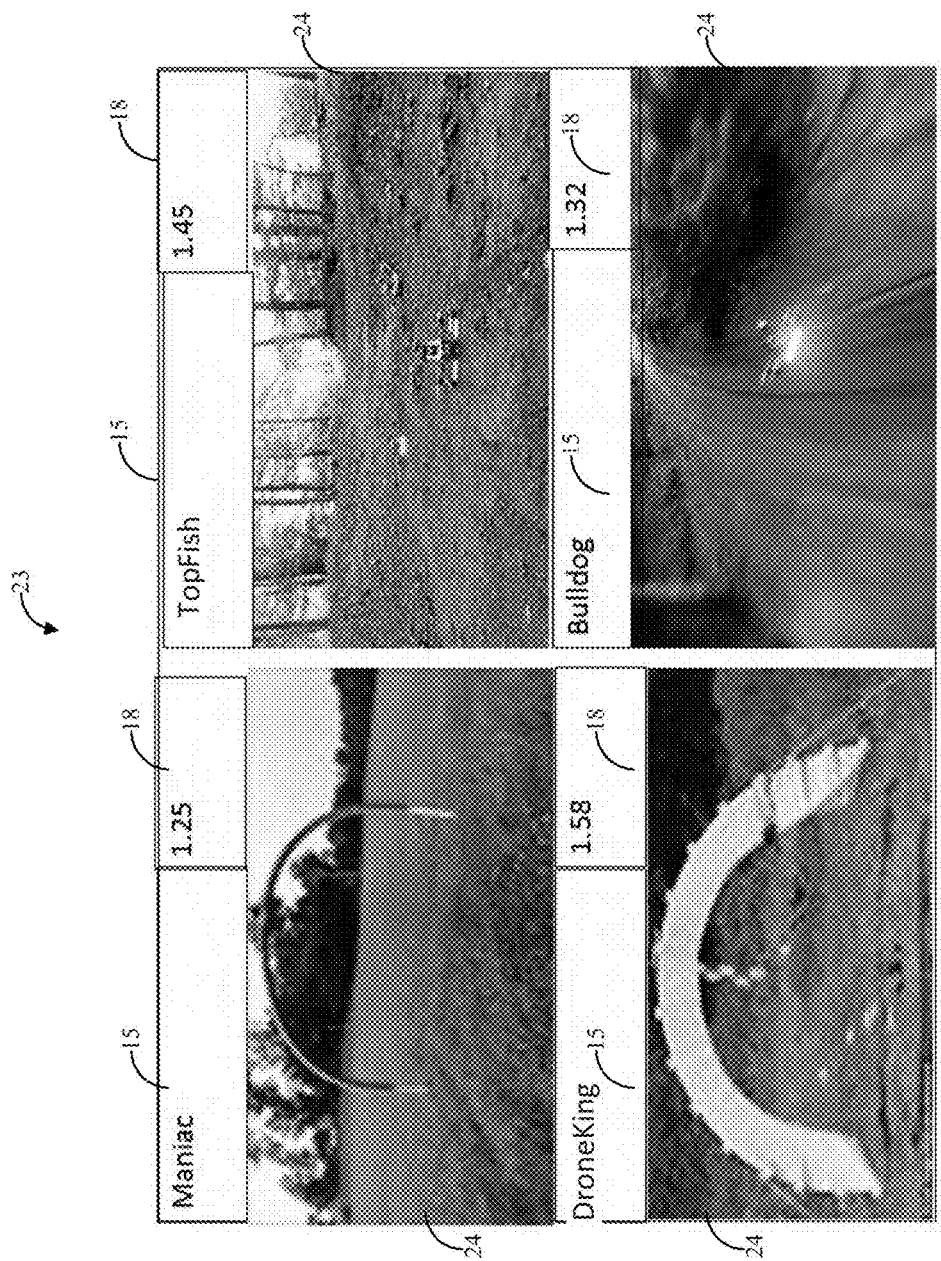
FIG. 7 depicts an exemplary embodiment of another leader board that shows split screen views of the participating drones with limited information about each drone.
Figure 8:
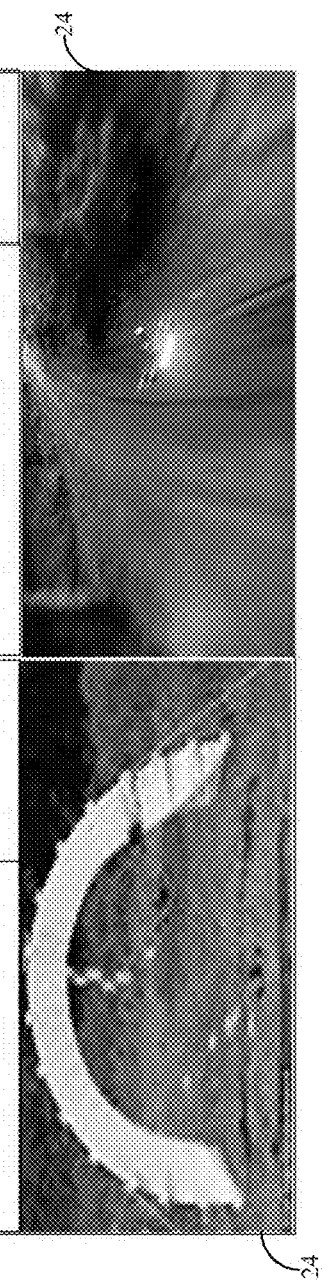
FIG. 8 illustrates an exemplary embodiment of a leader board that displays only two video feeds of the participating drones.

Shifting particular emphasis to FIG. 6, another exemplary embodiment of a leader board 22 is shown with enlarged views of video feeds 19 from the drone cameras. FIG. 7 depicts an exemplary embodiment of another leader board 23 that shows split screen views 24 of the participating drones 4 with limited information about each drone 4 such as name 15 and total time 18. FIG. 8 illustrates an exemplary embodiment of a leader board 25 that displays only two video feeds of the participating drones 4. In this exemplary embodiment, the leader board may cycle through the various video feeds of the participating drones 4, so as to provide all status information of the drones 4 and to provide enlarged views of the drones' video feed. Alternatively, the leader board may display photo or video feed of an information point along the race track, which may in various instances may be provided by the system to electronic devices, such as mobile devices such as for real-time or near real-time viewing by spectators.

In another embodiment of the present invention, the leader board may be synchronized with an online community with times displayed for pilots and/or participants. The online community may be hosted separately from the drone racing system 2, but may be designed to communicate with the drone racing system 2, so that for any past, ongoing, or future drone race or game, the online community may be updated with the scores and race/game information. Members of the online community do not necessarily have to be participants or pilots (former or current) to participate in the online community. The online community provides a forum for participants and pilots to interact, and the online community may be viewed or used via an application on a computing device.

Figure 9:
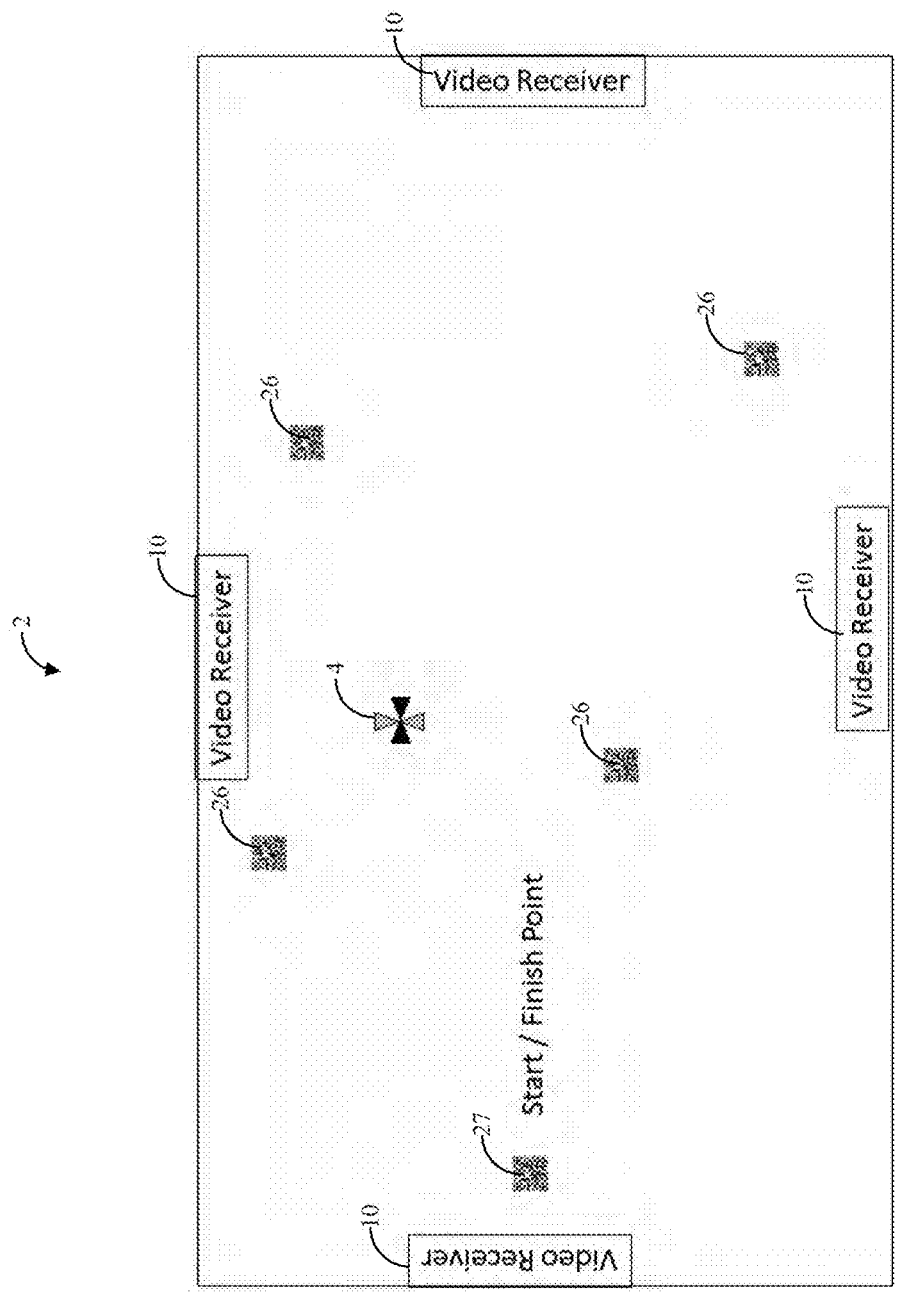
FIG. 9 illustrates an exemplary embodiment of the drone race system for conducting a drone race using data tags.
Figure 10:
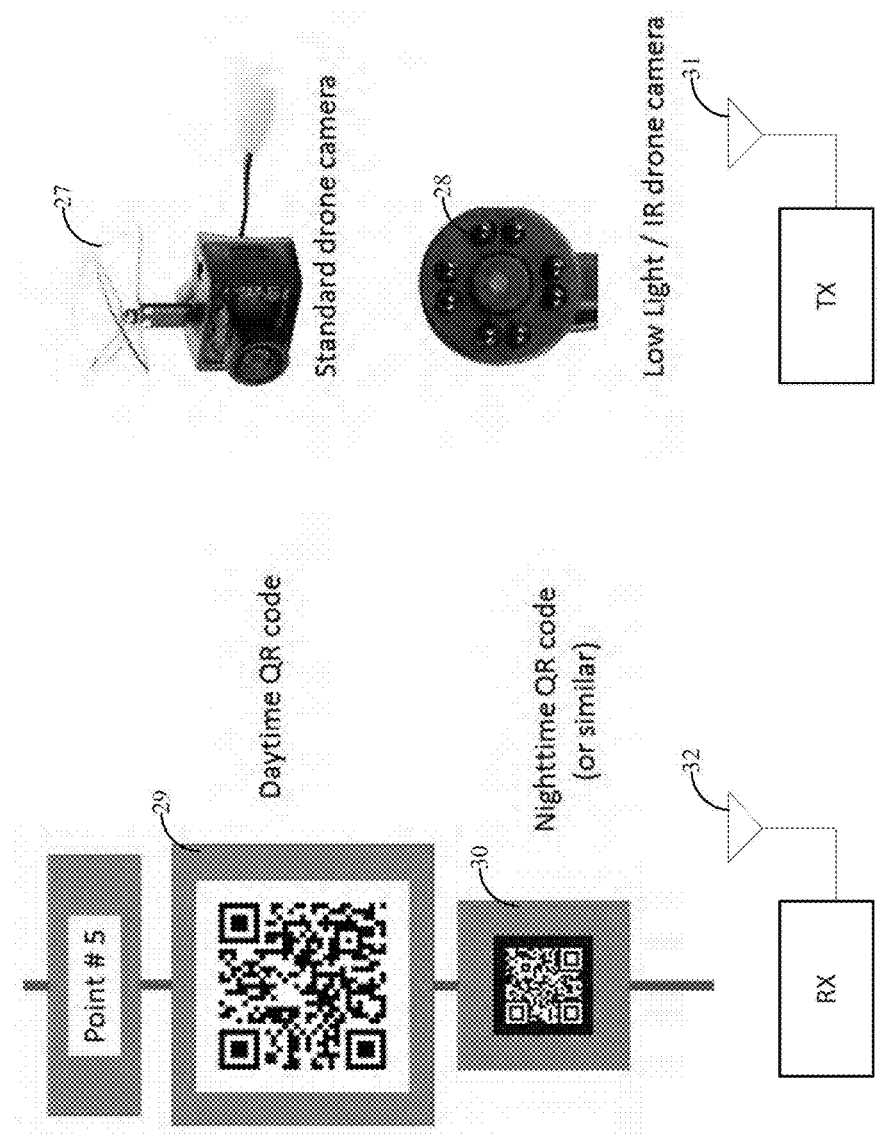
FIG. 10 illustrates elements of the exemplary embodiment of the drone race system for conducting the drone race using data tags.

Focusing primarily on FIG. 9, an exemplary embodiment is shown of the drone racing system 2 for conducting a drone race or game using data tags 26 such as bokodes, barcodes, QR codes, etc. For instance, data tags 26 may further comprise energy emission or receiving mechanisms, such as receivers 32 to detect the presence and/or strength of a radio frequency transmission from a drone 4, for instance, from a video transmitter 31 on the drone 4. FIG. 10 illustrates elements of the exemplary embodiment of the drone race or game system for conducting the drone racing system 2 using data tags 26. The drones 4 of the drone racing system 2 may be set up with cameras 27 or sensor readers, such as low light IR drone cameras 28, capable of detecting and processing data tags 26, such as a daytime QR code 29 or nighttime QR code 30. Alternatively the drones 4 of the drone racing system 2 may be set up with transmitters 31, such as video transmitters 31, capable of being detected by a receiver 32 emplaced to serve as a so-called data tag 26. These aspects such as data tags 26 may be set up at specific points in a contained area, and the pilot controls the drone 4 to each specific point where the drone 4 will detect and process the data tag 26 or will be detected and processed by the data tag 26. Upon detecting and processing, the drone racing system 2 updates to indicate that the drone 4 has been to a certain location. Once the drone 4 has interacted with all data tags 26, it has completed the race, and the finish time of the drone 4 will be compared to the finish time of other drones 4 to determine who wins.

In another embodiment, users of the drone racing system 2 may create a customized race track or race course with the virtual information points or other data tags 26 as navigational points. In this embodiment, participants in the drone race have the location of a first virtual information point, and upon reaching the first virtual information point, participants receive information about a second virtual information point. This pattern repeats itself and develops into a full-fledged race with a race track known only to the creator of the race track. Alternatively, the participants have the locations of all navigation points, and the drone racing system 2 provides a virtual racetrack for participants to follow through the use of an application on a computing device. The customized race track may be stored in the race server 1206 or on the computing device of the user that created it, for personal use. The user may create this customized race track by using a virtual map of the contained or designated areas, correlating to the current and actual structures and obstacles of the contained or designated areas, and assigning certain locations on this virtual map with virtual information points.

Figure 11:
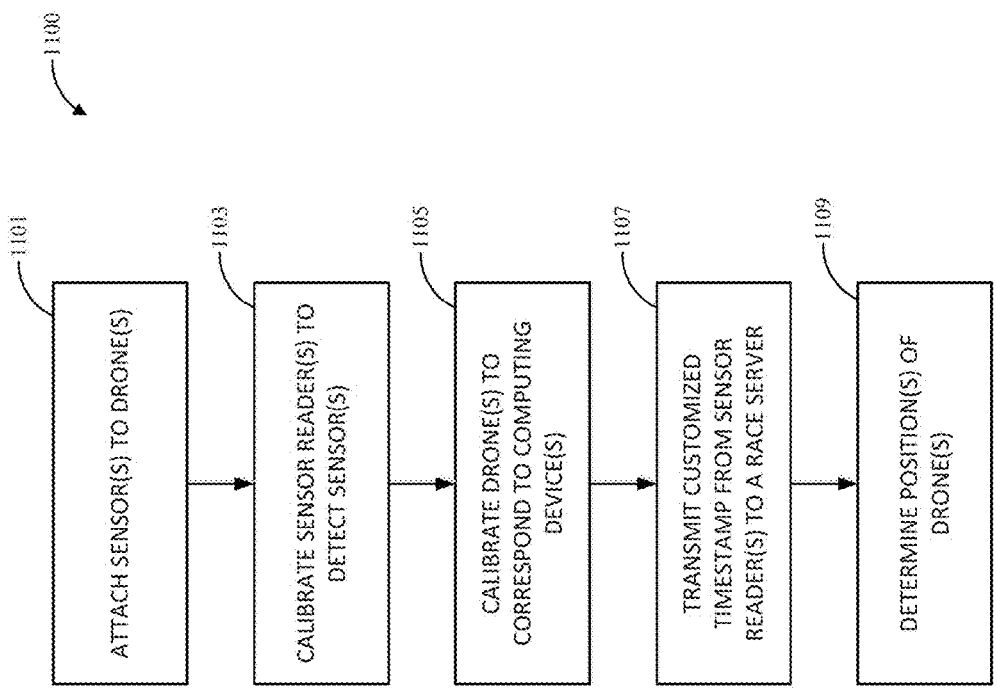
FIG. 11 is a flowchart of a method for conducting a drone race or game in a contained or designed area(s), in accordance with an illustrative embodiment.

FIG. 11 is a flowchart of a method for conducting a drone race 1100, such as in a contained or designated area(s), in accordance with an illustrative embodiment. The method for conducting a drone race 1100 may be implemented in a drone race or game system, such as embodiments of the drone race or game system in FIGS. 1-14 herein. The method for conducting a drone race 1100 may include attaching a sensor to each of the plurality of drones 4 (step 1101). The temporary or non-temporary (e.g., permanent) attachment may be accomplished by any currently existing or later developed method, and the sensors may be any currently existing or later developed sensor for automatic identification and data capture techniques. For instance, the method may include attaching a camera 27 and transmitter 31 to a drone 4. The transmitter 31 may emit RF energy.

In various instances, the method may also include wherein sensor readers, such as receivers 32 are calibrated to detect the sensors, such as transmitters 31 attached to the drones 4 (step 1103). In order for a drone race or game to be conducted in a contained or designated area(s), the sensor readers, such as receivers 32 attached to obstacles need to be able to detect whether a drone 4 has passed the obstacle with a certain percentage of accuracy and precision. The calibration of the sensor readers, such as receivers 32 may be accomplished by any currently existing or later developed method. For instance, a sensor reader such as a receiver 32 may be calibrated to determine the moment in which a drone 4 passes the obstacle such as by detecting a point of inflection in a signal amplitude trend of a signal from the transmitters 31 over time, such as to designate the closest approach of the transmitter 31 to the receiver 32.

In various instances, the drones 4 may be calibrated to correspond to a computing device (step 1105). By calibrating the drones 4 to correspond to a computing device, the drones 4 may be monitored by the computing device. Like the calibration of the sensor readers, the calibration of the drones 4 may be accomplished by any currently existing or later developed method. For instance, the computing device may be configured to associate an identifying feature of a signal from a transmitter 31 associated with the drone 4. For instance, such as identifying feature may comprise one or more data bit having a value addressing the drone 4.

A customized timestamp is transmitted to a race server 1206 from the sensor readers, such as receivers 32 (step 1107). The customized timestamp may include information about a nearby drone 4, a time the drone 4 was detected, and an obstacle structure that the sensor reader, such as receiver 32 is attached to. The sensor readers such as receivers 32 may transmit the customized timestamp through a communication channel to a race server 1206, using any currently exiting or later developed method.

Lastly, a position of each of the plurality of drones 4 is determined based on the customized timestamps transmitted from the sensor readers such as receivers 32 to the race server 1206 (step 1109). Because the customized timestamps transmitted to the race server 1206 at a certain time, the system can compare the times that the multiple timestamps were transmitted to determine who passed the sensor reader earliest amongst the drones 4 in a current lap around the race track, and therefore the drone race system can determine a position for each drone 4 relative to the other drones 4. All scores and positions may be ranked and placed on a community rank board. The community rank board may be hosted with social media platform, or on the internet.

Figure 12:
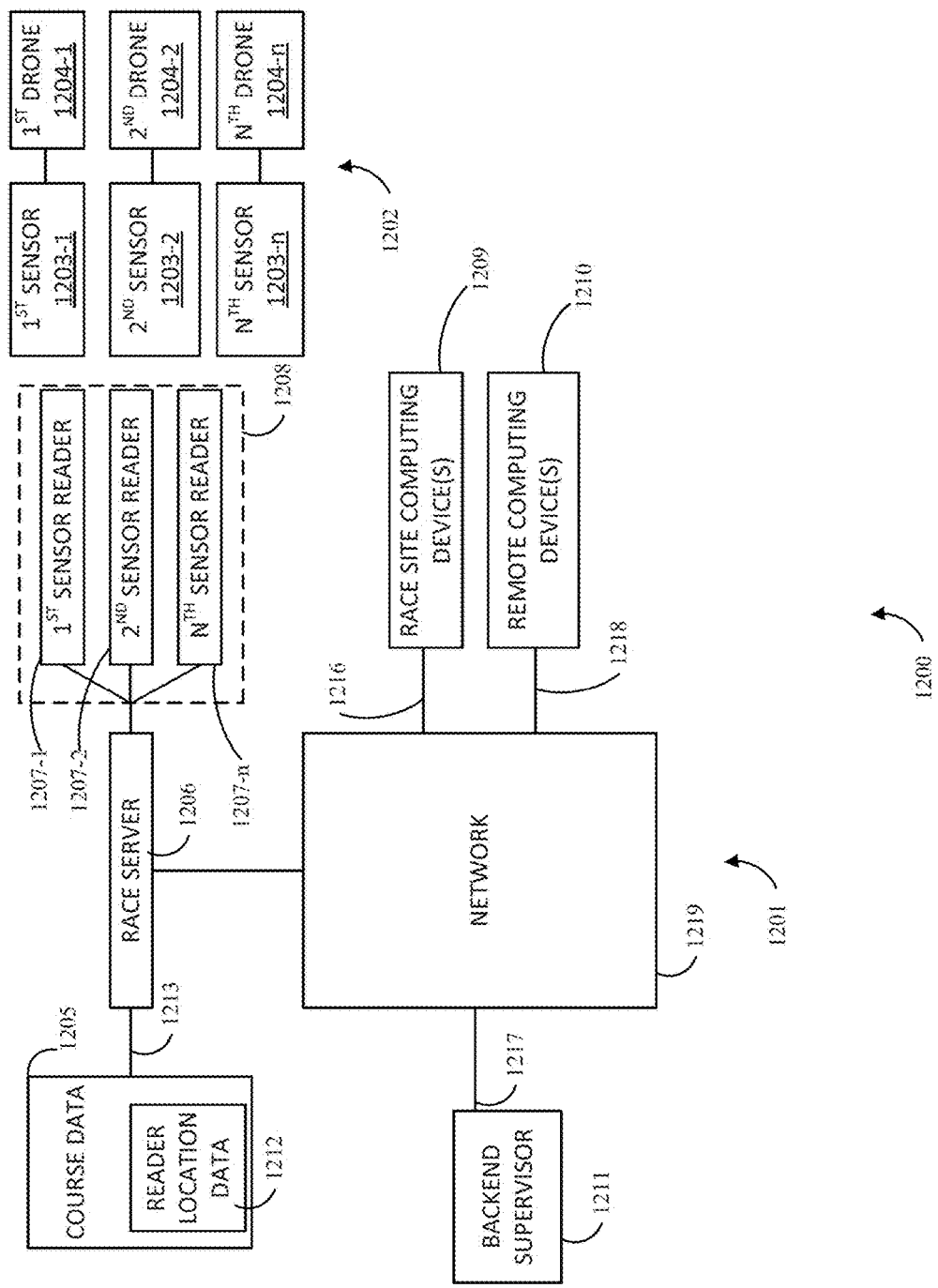
FIG. 12 depicts an example architecture of a drone race or game system, in accordance with an illustrative embodiment.
Figure 13:
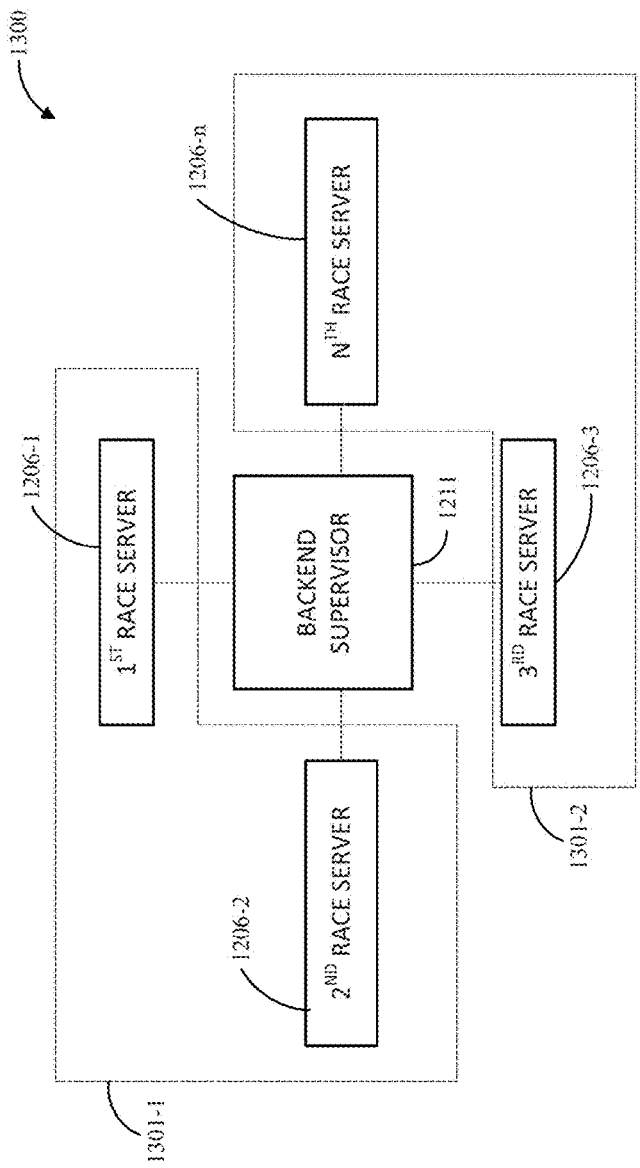
FIG. 13 depicts a multi-league racing environment, in accordance with an illustrative embodiment.

Directing attention to FIGS. 1-14, but with particular attention to FIG. 12, an example architecture 1200 of a drone racing system 2 is disclosed. A drone racing system 2 may comprise a race management environment 1201 and a race participant environment 1202. A race management environment 1201 may include aspects of the drone racing system 2 other than the participating vehicles. A race participant environment 1202 may include the participating vehicles, such as a drones 4 having sensors—for instance, a first drone 1204-1 and a first sensor 1203-1, a second drone 1204-2 and a second sensor 1203-2, and any number, n, such as an $N^{th}$ drone 1204-n with an $N^{th}$ sensor 1203-n.

The race management environment 1201 of the drone racing system 2 may comprise a race server 1206. A race server 1206 may interoperate with aspects of the drone racing system 2 as already discussed herein. The drone racing system 2 may be configured to transmit, receive, compile, compute, and interpret data associated with a drone race or game. Specifically, a race server 1206 may be connected via a course data channel 1213 to a course data repository 1205. The race server 1206 may send and receive data for storage via the course data channel 1213 to the course data repository 1205. This may include data representing the location of different features of a course, such as gates, hoops, starting points, ending points and the like, as well as data indicating an association between a sensor reader and a location on the course (reader location data 1212).

The race server 1206 may be connected via a sensor reader channel 1214 to a sensor reader array 1208. A sensor reader channel 1214 may comprise a wireless radio connection, an optical connection, and/or a wired connection such as via a computer network. The sensor reader array 1208 comprises a plurality of sensor readers disposed through the race or game course and associated with locations on the course (e.g., as indicated by reader location data 1212). In various instances the sensor reader array 1208 comprises a first sensor reader 1207-1, a second sensor reader 1207-2, and any number n of sensor readers such as a $N^{th}$ sensor reader 1207-n.

The race server 1206 may be connected to a network 1219. A network 1219 may comprise a third-party network such as the internet, or an intranet, or a wireless network, or a proprietary network, or any network or combination of network technologies as desired.

The race server 1206, via the network 1219, may interconnect to a backend supervisor 1211 via a backend supervisor communication channel 1217. The backend supervisor 1211 may comprise a processor and non-transient computer readable memory configured to interoperate with multiple race servers 1206 at different race sites, such as geographically or temporally dispersed race sites, and may coordinate shared data storage and data flow among the race servers 1206. For instance, with momentary additional reference to FIG. 13, a race server 1206 may be associated with a race or a group of races and a different race server 1206 may be associated with a different race or different group of races and the various races may be desired to be combined in a shared leader board for a geographically or temporally dispersed racing league or combination of leagues in competition. For instance, a multi-league racing environment 1300 may comprise a backend supervisor 1211 connected to a first race server 1206-1 and a second race server 1206-2 within a first racing league 1301-1, and a third race server 1206-3 and any number, n, of race servers such as a $N^{th}$ race server 1206-n within a second racing league 1301-2. The backend supervisor 1211 may coordinate leader board data among leagues to provide a shared leader board for inter-league or intraleague competition.

Returning primary reference to FIG. 12, the race server 1206, via the network 1219, may interconnect to one or more race site computing device 1209 via a race site communication channel 1216. A race site computing device 1209 may be associated with an operator of a racing drone 4 and may provide various information consistent with the discussion herein, such as first-person view video, control signals, leader board data, race course data and/or the like.

The race server 1206, via the network 1219, may interconnect to one or more remote computing device 1210 via a remote device communication channel 1218. A remote computing device 1210 may be associated with a spectator of a drone race may provide various information consistent with the discussion herein, such as first-person view video, leader board data, race course data and/or the like. In various instances. The remote computing device 1210 may be associated with an operator of a drone 4 not located at a race site and may provide first-person view video, control signals, leader board data, race course data and/or the like.

Figure 14:
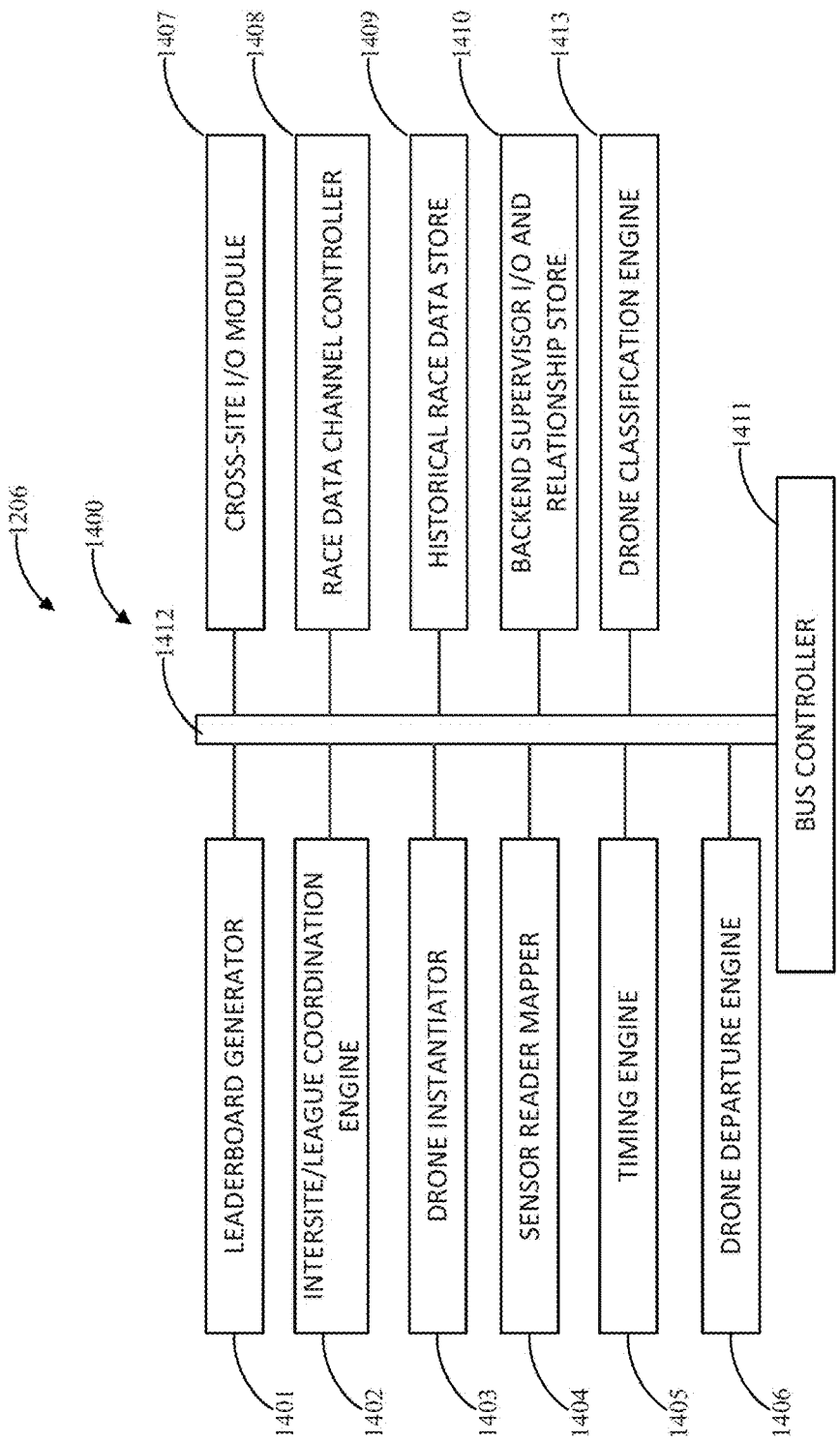
FIG. 14 depicts aspects of a leader board coprocessor of a drone race or game system, in accordance with an illustrative embodiment.

Shifting primary focus to FIG. 14, a race server 1206 and/or a backend supervisor 1211 may also include a leader board coprocessor 1400. In various instances, a leader board coprocessor 1400 comprises a leader board bus 1412 having various operative modules connected to it. While in various instances the bus may be a physical bus, in further instances the bus may be a logical bus. The leader board coprocessor 1400 may comprise a bus controller 1411 connected to the leader board bus 1412 and controlling the flow of data on the bus between various modules and directing the operation of the various modules, as discussed herein.

In various instances, a leader board may include advanced and automated aspects. For instance, a leader board may be set up by class of drone 4 participating in the drone race. The leader board may be divided according to an organization scheme, such as so-called 180 mm and below, 190-300 mm, and other size drones 4 as one having ordinary skill in the art may understand drones 4 to be classifiable. Thus a leader board may comprise a drone classification engine 1413. In various instances, a drone classification engine 1413 is configured to automatically receive self-reported classification data from a drone 4. For instance, a first drone 1204-1 may self-report via a signal from first sensor 1203-1 to a sensor reader that the drone 4 belongs in a particular class.

Similarly, a leader board may be set up by age of drone operator. Once again, the drone classification engine 1413 may receive self-reported classification data including age data, such as from a first drone 1204-1 via a first sensor 1203-1 to a sensor reader, or in further instances, from a race site computing device 1209 connected to the race server 1206 or from a remote computing device 1210 connected to the race server 1206. The age data, similar to the other classification data, may be stored in a database associated with the race server 1206 such as a course data repository 1205 to classify drones 4 currently operating on the race course. In a similar way, a leader board may be set up by school associated with a drone operator, or by a league associated with a race in which a drone 4 is participating. Thus, in this manner, the drone classification engine 1413 may direct the leader board generator 1401 to display the first drone 1204-1 within a first drone class in response to self-reported classification data from a first drone 1204-1 via a first sensor 1203-1 transmitting the self-reported classification data to a sensor reader of the drone race system.

Thus one may appreciate that the leader board coprocessor 1400 further comprises a cross-site/league coordination engine 1402. The cross-site/league coordination engine 1402 interoperates with a cross-site I/O module 1407 to send and receive data among different race servers 1206 and/or to a backend supervisor 1211 so that the leader board may be shared across multiple geographically or temporally dispersed races. The cross-site/league coordination engine 1402 sorts data received from other sites via a cross-site I/O module 1407 and prepares data for transmission to the other sites via the cross-site I/O module 1407. The cross-site I/O module 1407 formats the data according to a known format and instantiates transmission and reception request directives to initiate and/or conclude data exchanges. In various instances, a back end supervisor I/O and relationship store 1410 is further implemented to cache a local copy of data from other race servers 1206 and from backend supervisors 1211, such as for use in an offline race environment wherein the race is at a site disconnected from external network resources.

A leader board may display various data metrics about one or more drone 4 participating in a drone race or game. A leader board may comprise a data type, such as a leader board object, for ease of transmission by the leader board coprocessor 1400 of data among other system aspects. For instance, the leader board coprocessor 1400 may transmit various data via a race data channel controller 1408 to a network 1219 for distribution to race site computing devices 1209 or remote computing devices 1210. For instance, an application may be loaded on a smartphone and receive from the race data channel controller 1408 a visual depiction of a race course to allow an operator to fly a simulated lap through a race course without actually operating a physical drone 4 in the course. Moreover, the race data channel controller 1408 may provide data wherein an operator may search for and follow the activities of other operators, watch recorded races stored in a historical race data store 1409 of the leader board coprocessor 1400, and engage in discussions and posting comments.

The leader board coprocessor 1400 may use the race data channel controller 1408 to automatically publish results of races to other resources, display race segments or laps, allow comparison with other races on a same course, replay historical race video and source other static or dynamic data as desired (collectively, "Event Data"). Such other resources may include, for instances, a backend supervisor 1211, a course data repository 1205, or automatic publication may be made directly to race site computing devices 1209 and remote computing devices 1210, and/or to a historical race data store 1409 for later retrieval. Such results may include both real-time and non-real-time data, including drone geopositioning during races, geopositioning of races occurring on other race servers 1206 throughout the world, social media transmissions including automatic results posts, videos, event winner identity, and/or the like (also collectively, "Event Data"). Thus a leader board coprocessor 1400 may further comprise wherein the race channel controller 1408 is further configured to transmit the leader board object to the network for distribution to at least one social media account wherein the leader board object is configured to update the at least one social media account with an event data. In various instances, such event data is shareable via social media.

In various instances, the leader board coprocessor 1400 provides for automatic set up and on-the-fly reconfiguration of race courses and race participant information. For instances, the system may automatically learn the identity of participating drones 4, add drones 4 as the drones 4 appear at a starting point of a race, such as based on identifying addresses, frequencies, etc. associated with the drone 4, and may maintain a leader board over time. For instance, a leader board generator 1401 may instantiate a leader board as discussed herein. The leader board generator 1401 may solicit a drone instantiator 1403 to interoperate with the race data channel controller 1408 for receiving communication from sensor readers to count and identify drones 4 on the racing or game course. In various instances, the drone instantiator 1403 triggers the leader board generator 1401 via a message on the leader board bus 1412 to add a new drone 4 to a leader board. Thus the system further includes instantiating, by a drone instantiator 1403, a second drone 1204-2 for insertion into the leader board object in response to detecting by the sensor reader a second drone 1204-2.

Similarly, the system may automatically learn the identity of participating drones 4 and remove drones 4 as the drones 4 no longer appear at a point in the race, for instance, by failing to be detected by a sensor detector due to a crash, and/or by being detected at a stationary orientation during a drone race or game. In response to a drone 4 identified based on identifying addresses, frequencies, etc. associated with the drone 4, being determined to be inoperative, stationary, or having failed to be detected for a period of time, the drone departure engine 1406 may direct the leader board generator 1401 to remove a drone 4 from the leader board. For instance, a leader board generator 1401 may instantiate a leader board as discussed herein. The leader board generator 1401 may solicit a drone departure engine 1406 to interoperate with the race data channel controller 1408 for receiving communication from sensor readers to count and identify drones 4 on the racing or game course. In various instances, the drone departure engine 1406 triggers the leader board generator 1401 via a message on the leader board bus 1412 to remove the drone 4 from the leader board.

The system may also automatically learn the location of different sensor-readers on the race course or game. For instance, a sensor-reader mapper 1404 may interoperate via the race data channel controller 1408 with the different sensor readers of a sensor reader array 1208. By mapping the relative rise and fall of the signal strengths of the transmitted signals transmitted from the different drones 4 by each drone's sensor, a map may be developed over time of the relative locations of the sensor-readers in response to the relative rise and fall of the signal strengths as the drones 4 traverse the course.

Finally, the system may conduct race timing. For instance, a timing engine 1405 may interoperate via the race data channel controller 1408 with the different sensor readers of the sensor reader array 1208. The timing engine 1405 may monitor characteristics of the transmitted signals transmitted from the different drones 4 by each drone's sensor and ascertain a moment of closest approach of each drone 4 with each sensor receiver 32, thus determining the time at which the drone 4 passed the sensor receiver 32. As such, the system may time, by the timing engine 1405, a race of a first drone 1204-1 and a second drone 1204-2, in response to ascertaining at least one amplitude peak of a first transmitted signal of the first drone 1204-1 by at least one sensor reader and at least one amplitude peak of a second transmitted signal of the second drone 1204-2 by the sensor reader.

As indicated above, aspects of this invention pertain to specific "method functions" implementable through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to (a) information permanently stored on non-writeable storage media (e.g., read only memory devices within a computer such as ROMs or CD-ROM disks readable only by a computer I/O attachment); (b) information alterably stored on writeable storage media (e.g., floppy disks and hard drives); or (c) information conveyed to a computer through communication media, such as a local area network, a telephone network, a public network like the Internet. It should be understood, therefore, that such media, when carrying computer readable instructions that direct the method functions of the present invention, represent alternate embodiments of the present invention.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than recited unless the particular claim expressly states otherwise.

The invention claimed is:

1. A system for conducting a drone race or game in a contained area, comprising:
   a plurality of RF sensor readers attached to a plurality of obstacle structures of a race course, wherein each sensor reader detects a change in an amplitude of a radio transmission received from at least one of a plurality of drones, wherein each drone comprises a camera and a radio transmitter connected to the camera, the radio transmitter generating the radio transmission;
   a plurality of computing devices, wherein each computing device comprises a graphical user interface and corresponds to one of the plurality of drones to control the drone;
   a web server connected to a communication network, and to the plurality of computing devices via the communication network; and
   a video receiver separate from the plurality of sensor readers and configured to receive from at least one of the plurality of drones, the radio transmission and wherein the video receiver is configured to transmit a video feed encoded in the received radio transmission to the web server,
   wherein at least one RF sensor reader of the plurality of RF sensor readers sends a customized timestamp to the web server in response to a detection by the at least one RF sensor reader of (i) an initial rise and (ii) a subsequent fall in amplitude of the radio transmission,
   wherein the customized timestamp includes a time coinciding with a point of inflection of the amplitude of the radio transmission between (i) the initial rise and (ii) the subsequent fall in amplitude of the radio transmission,
   wherein the web server records a passage of a drone of the plurality of drones past the obstacle structure associated with the RF sensor reader that detects the point of inflection,
   wherein the passage of the drone past the obstacle structure of the race course coincides in time with the time included in the customized timestamp.

2. The system of claim 1, wherein the camera of each of the plurality of drones transmits the video feed to a corresponding computing device via the web server.

3. The system of claim 1, further comprising a plurality of cameras overlooking the drone race, wherein the web server is configured to receive a plurality of video feeds from the plurality of cameras overlooking the drone race.

4. The system of claim 1, wherein the web server determines a race position of each of the plurality of drones using the customized timestamp by mapping the race position at the time included in the customized timestamp to a location of the obstacle structure of the race course having the RF sensor reader that detects the point of inflection.

5. The system of claim 1, wherein the system comprises a leader board coprocessor configured to map a plurality of locations of the plurality of sensor readers attached to the plurality of obstacle structures of the race course in response to detection by the plurality of sensor readers of the point of inflection of the amplitude of the transmitted signal of the radio transmitter.

6. The system of claim 1, further comprising a plurality of FPV goggles, each corresponding and connected to one of the plurality of drones, wherein each FPV goggle of the plurality of FPV goggles receives and displays the video feed from the camera of the drone.

7. The system of claim 1, further comprising the graphical user interface generating a dynamic graphical view of the drone race, wherein the graphical user interface calculates a position of each of the plurality of drones.

8. The system of claim 1, wherein the system comprises a leader board coprocessor configured to remove the drone from a leader board in response to a sensor reader of the plurality of sensor readers not detecting the drone within an elapsed period of time.

9. A method of conducting a drone race or game in a contained area, comprising:

attaching a radio transmitter to each of a plurality of drones;

calibrating a plurality of sensor readers to detect the radio transmitter, wherein the plurality of sensor readers are attached to a plurality of obstacle structures of a race course;

calibrating each of the plurality of drones to correspond to a computing device;

transmitting a customized timestamp to a web server by a sensor reader of the plurality of sensor readers attached to the plurality of obstacle structures of the race course in response to an amplitude peak of the transmitted signal of the radio transmitter that is between an amplitude rise of the transmitted signal of the radio transmitter at a first time and an amplitude fall of the transmitted signal of the radio transmitter at a second time following the amplitude rise and the amplitude peak; and determining a position of each of the plurality of drones at a time corresponding to the customized timestamp, wherein the position corresponds to a position of the sensor reader attached to an obstacle structure of the plurality of obstacle structures of the race course that indicates the amplitude peak.

10. The method of claim 9, wherein a set of the plurality of drones uses location services and transmits a location to the web server for determining a position of the set of the plurality of drones.

11. The method of claim 9, further comprising: routing a received transmission from a plurality of video cameras overlooking the drone race to at least one graphical display.

12. The method of claim 9, further comprising: generating a dynamic graphical map comprising the drone race depicted in a three-dimensional view and generating locations of the plurality of drones superimposed on the dynamic graphical map.

13. The method of claim 9, wherein the radio transmitter is associated with a camera attached to at least one drone of the plurality of drones and emitting a transmitted signal received by a video receiver separate from the sensor reader.

14. The method of claim 9, further comprising:

generating a leader board display for display on a graphical user interface, wherein the leader board display comprises a plurality of received transmissions from a plurality of video cameras, and position information for each of the plurality of drones, and wherein the leader board display further comprises a dynamic graphical map that updates map positions of graphical representations of the plurality of drones.

15. A leader board coprocessor of a race server of a drone race system comprising a processor and a tangible, non-transitory memory configured to communicate with the processor, the tangible, non-transitory memory having instructions stored thereon that, in response to execution by the processor, cause the processor to perform operations comprising:

receiving, by a drone classification engine, a self-reported classification data from a first drone via a first sensor transmitting the self-reported classification data to a sensor reader of the drone race system, wherein the sensor reader is attached to an obstacle structure of a race course;

wherein the drone classification engine directs a leader board generator to display the first drone within a first drone class;

transmitting, by a race channel controller, a leader board object to a network for distribution to at least one of a race site computing device and a remote computing device;

instantiating, by a drone instantiator, a second drone for insertion into the leader board object in response to detecting by the sensor reader that is attached to the obstacle structure of the race course, the second drone; and timing, by a timing engine, a race of the first drone and the second drone, wherein the timing the race comprises:

(a) ascertaining by the sensor reader that is attached to the obstacle structure of the race course (i) an initial rise and (ii) a subsequent fall in amplitude of a first transmitted signal of the first drone by the sensor reader that is attached to the obstacle structure of the race course;

(b) generating, by the sensor reader that is attached to the obstacle structure of the race course, a first customized timestamp including a time coinciding with a point of inflection of the amplitude between the initial rise and the subsequent fall of the first transmitted signal;

(c) ascertaining by the sensor reader that is attached to the obstacle structure of the race course (i) an initial rise and (ii) a subsequent fall in amplitude of a second transmitted signal of the second drone by the sensor reader that is attached to the obstacle structure of the race course; and (d) generating, by the sensor reader that is attached to the obstacle structure of the race course a second customized timestamp including a time coinciding with a point of inflection of the amplitude between the initial rise and the subsequent fall of the amplitude of the second transmitted signal.

16. The leader board coprocessor of a race server of a drone race system comprising the processor and the tangible, non-transitory memory configured to communicate with the processor according to claim 15, the tangible, non-transitory memory having instructions stored thereon that, in response to execution by the processor, cause the processor to perform operations further comprising:

transmitting by the race channel controller the leader board object to the network for distribution to at least one social media account wherein the leader board object is configured to update the at least one social media account with an event data, wherein the event data is shareable.

* * * * *